United States Patent
Miller et al.

(10) Patent No.: US 6,212,568 B1
(45) Date of Patent: Apr. 3, 2001

(54) RING BUFFERED NETWORK BUS DATA MANAGEMENT SYSTEM

(75) Inventors: Matthew J. Miller, Hanover, NH (US); Lawrence C. Freudinger, Lancaster, CA (US); Ian A. Brown, Orford; William R. Baschnagel, Etna, both of NH (US)

(73) Assignee: Creare Inc., Hanover, NH (US)

( * ) Notice: Subject to any disclaimer, the term of this patent is extended or adjusted under 35 U.S.C. 154(b) by 0 days.

(21) Appl. No.: 09/073,563

(22) Filed: May 6, 1998

(51) Int. Cl.$^7$ .............................. G06F 15/16; H04L 12/18
(52) U.S. Cl. ......................... 709/236; 709/231; 370/498
(58) Field of Search ............................ 709/230, 231, 709/236, 246, 204, 206; 370/218, 259, 270, 498

(56) References Cited

U.S. PATENT DOCUMENTS

| | | | |
|---|---|---|---|
| 4,884,217 | 11/1989 | Skeirik et al. | 706/56 |
| 5,195,092 | * 3/1993 | Wilson et al. | 370/498 |
| 5,341,476 | 8/1994 | Lowell | 709/219 |
| 5,537,533 | 7/1996 | Staheli et al. | 714/5 |
| 5,544,320 | 8/1996 | Konrad | 709/203 |
| 5,557,798 | 9/1996 | Skeen et al. | 705/35 |
| 5,606,705 | 2/1997 | Randall et al. | 709/203 |
| 5,613,155 | 3/1997 | Baldiga et al. | 710/5 |
| 5,634,010 | 5/1997 | Ciscon et al. | 709/223 |
| 6,104,696 | * 8/2000 | Kadambi et al. | 370/218 |

\* cited by examiner

Primary Examiner—Dung C. Dinh
(74) Attorney, Agent, or Firm—Downs Rachlin & Martin PLLC (57) ABSTRACT

A data management system (10) for managing and distributing high-speed, real-time and archived data between diverse local and remote data sources (26) and data sinks (30). The system includes a server (12) having cache memory (14) and archive memory (18) and one or more ring buffered network bus (RBNB) modules (24). Each RBNB module features a highly modular, object-oriented design, with the RBNB module being the highest level object in the system. The RBNB modules include a plurality of ring buffer objects (42) that handles data streams from data sources, a plurality of network bus objects (44) that handle data streams to a data sinks, and RBNB control objects (40) the handle connections for the ring buffer objects and network bus objects. Data is handled by the RBNB module in data frame (68) increments based on the combination of identified channels (116) and time stamps (250).

37 Claims, 8 Drawing Sheets

RING BUFFERED NETWORK BUS DATA MANAGEMENT SYSTEM

This invention was made with Government support under contracts NAS4-50071 and NAS4-97010 awarded by the National Aeronautics and Space Agency. The Government has certain rights in the invention.

FIELD OF THE INVENTION

The present invention pertains to hardware and software network systems for managing and distributing high-speed, real-time and archived data between diverse local and remote data sources, data sinks and observers.

BACKGROUND OF THE INVENTION

The tremendous growth in networked-based distributed computing environments has created correspondingly growing needs for efficient mechanisms by which to share information. In the discussion which follows, the terms data "source" and "sink" refer to the supplier and destination of information, respectively.

Networked communication technology has historically been point-to-point. That is, a source of information and a destination (sink) for that information send and receive data over a dedicated connection between them. More recent technologies have expanded upon this concept to allow various "multicast" capabilities, wherein a data source can transmit information to a non-specific destination, and multiple data sinks can simultaneously subscribe to this flow of information through connection to a source-specific multicast address.

Additional prior art development has further abstracted the multicast concept to a "publish/subscribe" approach which allows a data source to publish data which is encoded by "subject," such that data sinks can subscribe to information by data type as opposed to a specific data source. One such technology identified by the trademark TIB, is provided by Tibco, Inc. of Palo Alto, Calif., and is described in U.S. Pat. No. 5,557,798 to Skeen et al. ("the '798 patent"). The technology described in the '798 patent features a message distribution system that uses middleware to provide the ability for data sources (publishers) to send data, and data sinks (subscribers) to request data by subject type. The '798 patent does not provide a direct means to access data from an intermediate buffered server by a combination of timestamp and explicit source (i.e., channel) reference.

Whereas multicast and publish-subscribe approaches provide a single-source to multiple-sink (one-to-many) capability, the inverse is not generally true. That is, a many-to-one system has additional complexity and requirements. Finally, the more general many-to-many system can require an exponential growth in the number of network connections, resulting in inefficient communication performance. This many-to-many network data distribution problem has many proposed prior art solutions, each with varying degrees of efficiency and practicality.

One approach for data distribution in a many-to-many connected network is described in U.S. Pat. No. 5,634,010 to Ciscon et al. ("the '010 patent"). The '010 patent discusses intermediate data routers which can send data to multiple destinations, per predetermined routing requests. The data objects that are sent each have a time stamp, properties, addressing information, and underlying data. Application processes register for certain "types" of data, and routers send out data based on registered "interest tables." As with other related art, the '010 patent does not address time-stamped buffering of data, only routing it "on the fly."

Existing prior art addresses time-stamped data to varying degrees. Many ignore any time-relevancy of the data. Others recognize and provide means to supply "real-time" information. In both of these cases, it is left to the data sinks to receive data as it is sent from a data source; that is, the time-stamp of the data is either "as provided" or "now." In both cases however, data sinks have no efficient means to request and receive data with intermediate time-stamps, i.e, smoothly transitioned between current and historical data at the discretion and request of the data sink.

For example, a data sink may require (say for purposes of statistical analysis) the most recent contiguous block of time-series data from a source. With existing prior art technologies, the sink either has to have already saved the historical information, or ask the data source to re-transmit the data. Neither of these options are practical or convenient for a sink which lacks the required foresight or resources.

U.S. Pat. No. 4,884,217 to Skeirik describes an expert system having three classes of rules and makes brief reference to a historical process database" (HPD) with the stated goals of offering buffered, time-stamped storage to multiple sources and end-users with a "standardized" data interface. But the HPD is a small piece in a more complex expert system, and as such is not an independent network-accessible data server. Also, reference to function and structure of the HPD is described in such cursory form that it is believed one skilled in the art would be unable to use the HPD concept as a component of general data distribution and management system.

U.S. Pat. No. 5,606,705 to Randall et al. ("the '705 patent") discusses a current value table approach in which "data items" are retained until they become "too old," then they are re-fetched from the source(s). Here, data sources are queried for data, which limits the flexibility of data communication insofar as data sources are apparently not able to send data to data sinks at their own initiate. In addition, the system of the '705 patent is apparently not geared for continuous data. Instead, the system focuses on groups of quasi-static data items which may change only infrequently. As such, it appears the system of the '705 patent is geared more towards hardware or a microcontroller solution versus a portable software solution.

SUMMARY OF THE INVENTION

One aspect of the present invention is a data management system comprising at least one server having cache memory and archive memory, and at least one RBNB module operatively associated with the at least one server. Each of the RBNB modules includes a plurality of ring buffer objects. Each ring buffer object has a ring buffer data structure for storing data, a single data input connectable to a data source and connected to the ring buffer data structure so that data provided by the data source may be stored in the ring buffer data structure, and one or more RBO data outputs connected to the ring buffer data structure for providing data stored in the ring buffer data structure. Each RBNB module also includes a plurality of network bus objects. Each network bus object has one or more inputs, each connected with at least one of the one or more RBO data outputs so as to receive data stored in the ring buffer data structure, and a single NBO data output, connectable to a data sink, for providing to the data sink the data received from the at least one of the one or more RBO data outputs.

Another aspect of the present invention is a server network for use in communicating data from at least one data source to at least one data sink, each data source having at least one channel with associated data. The server network comprises a plurality of ring buffer objects. Each of the ring buffer objects includes means for creating a plurality of data frames, each having data that is identified with one or more channels of the data source, means for adding a time stamp to each of the plurality of data frames, and a ring buffer data structure for storing the plurality of data frames.

Yet another aspect of the present invention is a method of transferring data from a data source to a data sink. The method comprises as a first step receiving data from a data source via a single data stream. Next, the data is stored in a ring buffer data structure in which newest data is placed at a new data end of the ring buffer data structure and oldest data is deleted from an old data end of the ring buffer data structure to make room for new data. The next step is providing data from the ring buffer data structure via two or more first data streams. Then data is received from two or more second data streams, only one of which consists of one of the two or more first data streams. As the last step, all the data received in the previous step is provided via a single data stream.

DETAILED DESCRIPTION OF THE INVENTION

Figure 1:
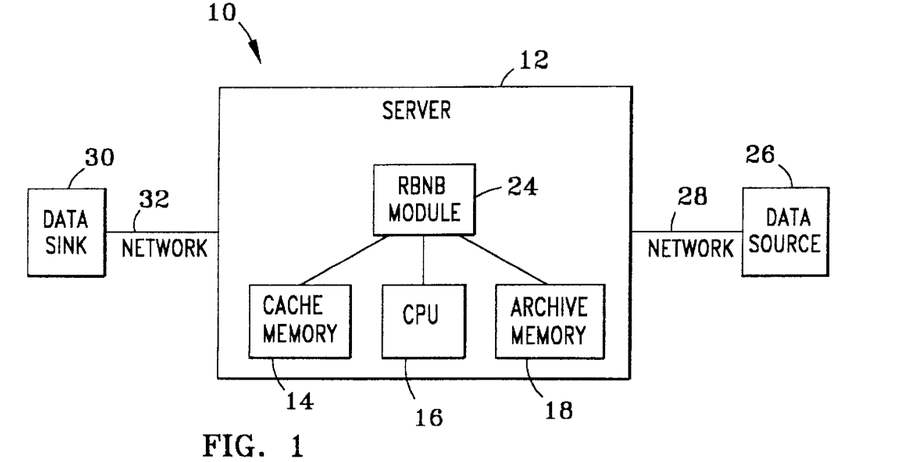
FIG. 1 is a block diagram of the RBNB data management system of the present invention.

Referring to FIG. 1, the present invention is a ring buffered network bus ("RBNB") data management system 10 for managing and distributing high-speed, real-time and archived data between diverse local and remote data sources. As described in more detail, the architecture of RBNB data management system 10 provides a modular, scalable environment in which the necessary configuration, routing and data archival services are provided.

In its simplest implementation, RBNB data management system 10 comprises a server 12 having cache memory 14, which is typically semiconductor random access memory (RAM), a central processing unit 16 (i.e., CPU 16), and archive memory 18, which typically is typically disk, tape, semiconductor or other memory with a lower access speed and greater capacity than cache memory 14. Server 12 may comprise a conventional digital computer of the type used as a server in networked PC environments, multiple servers of this type, or other specialized or general purpose digital computers, and so includes other known elements in addition to cache memory 14, CPU 16 and archive memory 18. In this regard, server 12 is not limited by type of CPU, operating system, or architecture it utilizes.

RBNB system 10 also includes an RBNB module 24. The latter is a software module that is operatively associated with cache memory 14, CPU 16, and archive memory 18. Server 12 is connected to a data source 26 by network 28 and is connected to a data sink 30 by network 32. As used herein, the term "data source" means any device that sends data and "data sink" means any device that obtains data from a data source. Networks 28 and 32 may comprise almost any data network including the Internet, intranets, and internal networks. As described below, RBNB module 24 takes care of storing, queuing and routing data between data source 26 and data sink 30, as well as a potentially large number of other data sources and data sinks.

Figure 2:
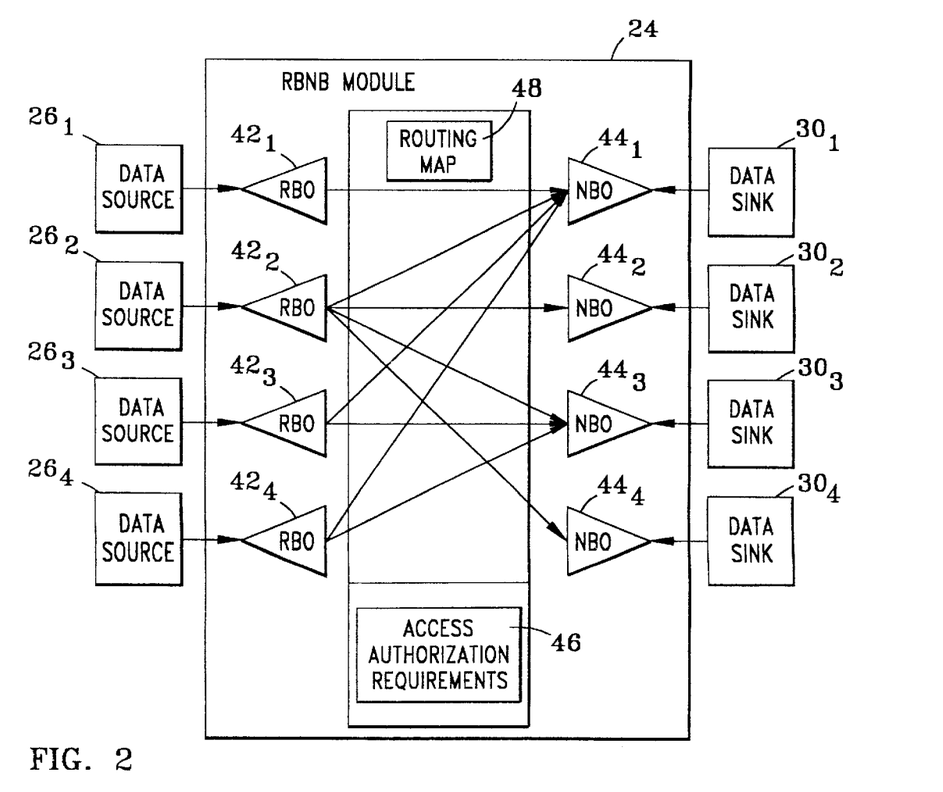
FIG. 2 is a block diagram of the RBNB module.

Referring to FIG. 2, RBNB module 24 is highly modular and employs an object-orientated design approach. RBNB module 24 is the highest level object, and forms the backbone of RBNB data management system 10. RBNB module 24 manages all network data transfers from data sources 26 to data sinks 30, and is responsible for maintaining local and network routing information and data security.

RBNB module 24 in turn is made up of five key elements. These are RBNB control object (RCO) 40, ring buffer object (RBO) 42, network bus object (NBO) 44, access authorization requirements 46 and channel routing map 48. As used herein, "object" refers to a component whose principal purpose is to take action or control information. Each RBO 42 handles data streams from a respective data source 26. Each NBO 44 handles data streams to a respective data sink 30. RCOs 40, which are not shown in FIG. 2 to simplify illustration, handle the connections for each RBO 42 and NBO 44. Access authorization requirements 46 determine who can connect to RBNB module 24 and use particular commands in the RBNB module. Channel routing map 48 provides routing information for active as well as potential client connections.

As described below, RCO 40, RBO 42 and NBO 44 together form the modular building extendible, real-time, continuous data distribution network. As illustrated in FIG. 2, a typical RBNB module 24 will have multiple RBOs and NBOs, where each RBO is associated with a respective data source 26 and each NBO is associated with a respective data sink 30. For example, RBO $42_1$, handles data streams from data source $26_1$, RBO $42_2$ handles data streams from data source $26_2$, and so forth, and NBO $44_1$, handles data streams to data sink $30_1$, NBO $44_2$ handles data streams to data sink $30_2$, and so forth. A given NBO 44 can handle a consolidated data stream containing data from multiple RBOs 42. For example, NBO $44_3$ handles data from RBO $42_2$, RBO $42_3$ and RBO $42_4$.

RCO

Figure 3:
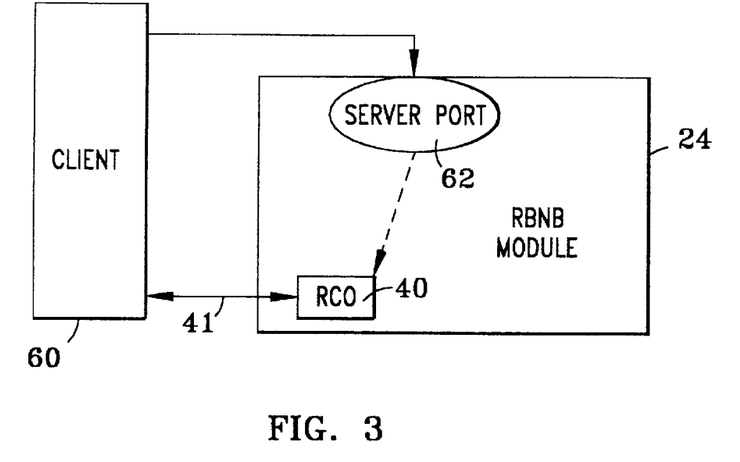
FIG. 3 is a block diagram of the RBNB module and a client.

Referring to FIG. 3, server port 62 initiates all connections to RBNB module 24. An RCO 40 is spawned by RBNB module 24 whenever a client 60 connects to server port 62 of the RBNB module. Client 60 may be any of a data source 26, a data sink 30, a remote RBNB module 24 and a control only (non-data) client. In this regard, when a client 60 comes to server port 62, RBNB module 24 starts an RCO 40 which in turn initiates a new private communication port 41 between it and the client 60, leaving the public server port ready for the next client 60 to connect with the RBNB module 24.

Based on the nature of client 60, RCO 40 takes one of several actions. If client 60 is a data source 26, RCO 40 spawns an RBO 42 and handles commands and responses for the RBO. If client 60 is a data sink 30, RCO 40 spawns an NBO 44 and handles commands and responses for the NBO. Client 60 and RBO 42 or NBO 44 send control and status information through the RCO 40. A direct connection between a client 60 and RBO 42 or NBO 44 is also established to pass the data. To achieve these functions, RCO 40 has data structures that identify the RCO itself, the port 41 connecting the RCO to a client 60, the host machine of the client, the function performed by the RCO, pointers to the associated RBO 42 or NBO 44, and other control information, e.g., an access authorization table.

In addition, a client 60 can control the operation of RBNB module 24 through an RCO 40. This capability is used to configure RBNB module 24 and monitor its operations. The RCO 40 can also be used to establish RBNB-to-RBNB data routing and mirror connections, discussed in detail later.

RBO

As noted above, RBO 42 handles the interface between a data source 26 and the RBNB module 24. Each RBO 42 has a single data input source, i.e., it accepts a single input data stream, but can have a single or multiple data output sinks, i.e., it provides one or more output data streams, as illustrated in FIG. 2. RBOs 42 perform a critical "ring buffering" function. This enables downstream data sinks 30 to request contiguous segments of the "most recent" data for display and analysis applications that require more than scalar current value tables, as described in more detail below.

Figure 4:
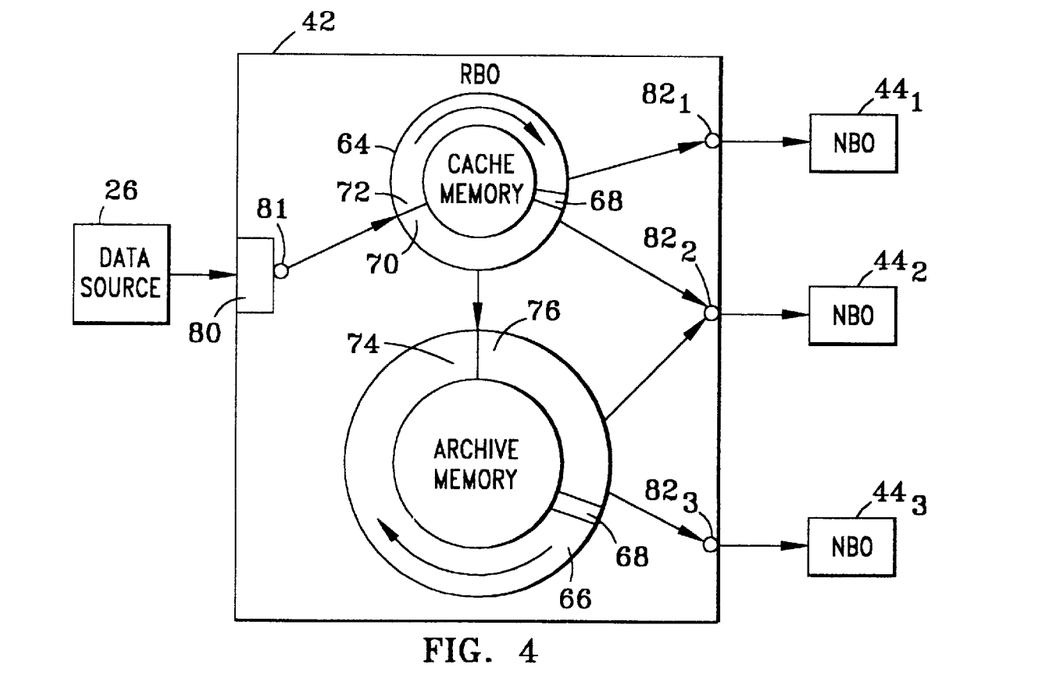
FIG. 4 is a block diagram of the RBO.

Referring to FIG. 4, RBO 42 is connected to cache memory 14 for high-speed gapless access to a specified amount of most-recent data and to archive memory 18 for playback of historical data. RBO 42 organizes data in cache memory 14 in a ring buffer data structure 64 (generally referred to henceforth as ring buffer 64) and data in archive memory 18 in a ring buffer data structure 66 (generally referred to henceforth as ring buffer 66), so that together the cache and archive memory provides both high performance and long-term "deep" memory storage. In FIG. 4, ring buffer 64 for cache memory 14 and ring buffer 66 for archive memory 18 are included in the box representing RBO 42 to facilitate description and illustration of the invention. However, it is to be appreciated that RBO 42 is connected with, but does not include, cache memory 14 and archive memory 18.

RBOs 42 are automatically started by RBNB module 24 when a connection to a data source 26 is established. RBO 42 takes data from data source 26 in the form of data frames 68, which are discussed in more detail below, and places those frames into ring buffer 64. The latter is filled with data frames 68 beginning at new data end 70 (FIG. 4). Once the configured size of ring buffer 64 is reached, new data frames 68 replace the oldest data frames in cache memory 14, i.e., data frames at old data end 72 are discarded and replaced with new data frames producing a continuous ring of data. Any data frames 68 in ring buffer 64 can be accessed at any time until they are overwritten by newer data frames, i.e., the ring buffer is random-access. It is this combination of overwriting the oldest data and random access which defines the ring buffer 64 data structure that RBO 42 creates when it stores data frames 68 in cache memory 14, and which distinguishes the ring buffer data structure of the present invention from other buffer types, such as a queue or FIFO.

RBO 42 may be configured to operate in a recording mode in which data frames 68 placed in ring buffer 64 are placed into archive memory 18 in ring buffer data structure 66 for long-term storage. The data may not be written to ring buffer 66 immediately, but instead may be archived later depending on the data handling demands on RBO 42. Data frames 68 are stored in ring buffer 66 in essentially the same way they are stored in ring buffer 64, described above. Thus, new data frames 68 are added to ring buffer 66 at new data end 74, with the oldest data frames at old data end 76 being discarded to make room for new data frames such that a continuous ring of data frames is maintained. Thus, data from data source 26 enters RBO 42 via its input 81 connected to input port 80 and is delivered to ring buffer 64, from which it is written to ring buffer 66.

Unless specifically indicated otherwise, future reference to the storage of data in cache memory 14 and archive memory 18 presumes the data is being stored in the ring buffer data structure described above. The ring buffer data structure is described in more detail below following a more complete description of data frames 68.

RBOs 42 provide data to NBOs 44 by providing the NBOs with direct access to the RBOs ring buffer data structures in cache memory 14 and archive memory 18. Thus, as illustrated in FIG. 4, data from ring buffer 64 is provided via outputs $82_1$ and $82_2$ of RBO 42 to NBOs $44_1$ and $44_2$. Similarly, data from ring buffer 66 is provided via outputs $82_2$ and $82_3$ to NBOs $44_2$ and $44_3$. NBOs 44 are described in more detail below. This limited description of NBOs 44 is provided as background to the following additional description of RBOs 42.

Data frames 68 being read by NBO 44 from ring buffers 64 and 66 under the control of RBO 42 are locked to ensure the RBO does not write over them while they are being read. RBO 42 also locks data frames 68 it is writing to ring buffers 64 and 66. To achieve this locking, RBO 42 maintains a buffer lock table that identifies which regions of ring buffers 64 and 66 are locked, whether a write request has been received, whether a write lock is active and the number of read locks.

Figure 5A:
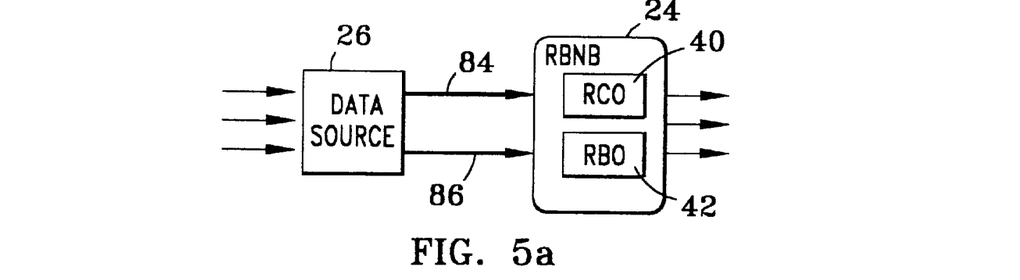
FIGS. 5a–5c are block diagrams illustrating the three operational modes of the RBO.
Figure 5B:
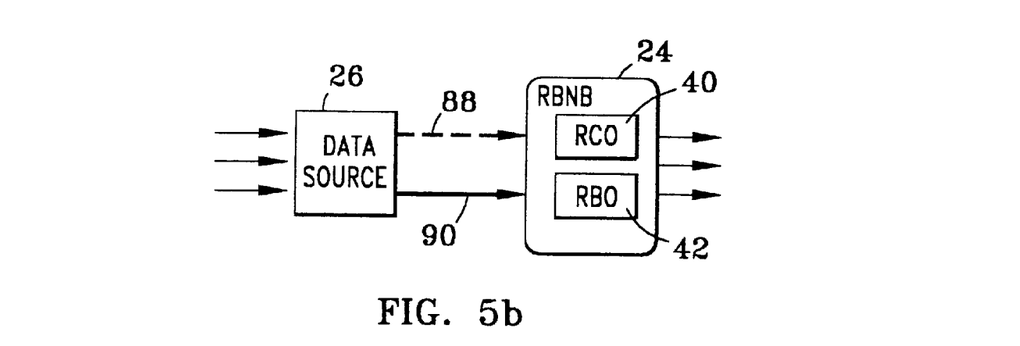
Figure 5C:
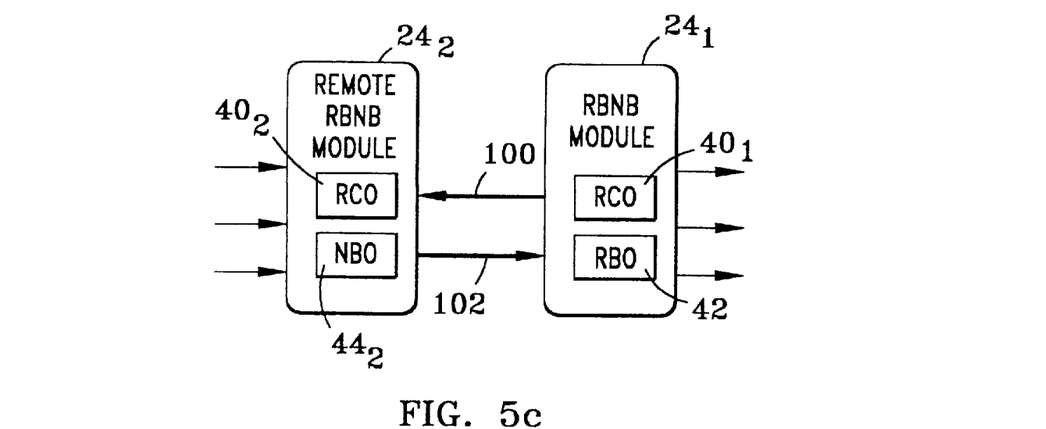

Referring to FIGS. 5a, 5b and 5c, RBO 42 can operate in three modes: client-controlled request/response mode (FIG. 5a), client-controlled streaming mode (FIG. 5b) and RBO-controlled request/response mode (FIG. 5c). Client-controlled request/response mode is the basic mode of operation of RBO 42. In this mode a client, e.g., data source 26 (FIG. 5a), sends a "request" to RBNB module 24 via line 84 in the form of a data frame header 202 message, described in more detail below, provided to RCO 40. RBNB module 24 responds by causing RBO 42 to read data from client 26 via line 86 which it puts in ring buffer 64.

Referring to FIG. 5b, client-controlled streaming mode, provides faster continuous data transfer at the cost of some flexibility. Instead of sending a data frame header 202 message to RCO 40 for each data frame 68, data source 26 (FIG. 5b), sends a one-time data frame header message via line 88 describing future data frames and tells RBNB module 24 how to automatically update time stamps 250, discussed below, in the data frame header for the data frames. So long as the data has the same format as described in such header, data source 26 can then send RBO 42 via line 90 just the data for each data frame 68, i.e., it can "stream" the data.

RBO-controlled request/response mode lets RBO 42 request the data rather than have data source 26 volunteer it. This mode is typically used to mirror data from a remote RBNB module 24 which functions as a data source 26, as discussed in more detail below. Referring to FIG. 5c, when an NBO $44_1$ (not shown in FIG. 5c) presents a request for data to RBO 42 in RBNB module $24_1$, RCO $40_1$ associated with the RBO sends the request via line 100 to RCO 40₂ in remote RBNB module 24₂. The latter responds by sending one or more data frames from NBO 44₂ to RBO 42 in RBNB module 24₁, with the data frame header 202 message being sent to RCO 40₁ via line 100 and the data being sent to the RBO via line 102.

In the RBO-controlled request/response mode, ring buffers 64 and 66 are not used. Instead, data is transferred directly from a client 60 to the requesting NBO 44.

To achieve the above-described functions, RBO 42 has various data structures that, among other things, identify the RCO 40 controlling the RBO, uniquely identify the RBO within the parent RBNB module 24, identify the host machine of the client 60, and identify port 80 used by the RBO. In addition, such data structures identify whether the client or RBO controls the operation, identifies the operation mode, i.e., request/response or streaming, identifies whether or not the RBO supplies time stamps 250, identifies the channels 116, discussed below, registered to the RBO, lists frame headers 202 in the current group of data frames 68, and entry points in the frame header field, and maintains pointers to ring buffers 64 and 66.

NBO

Referring now to FIGS. 1–3 and 6, NBO 44 will be described in greater detail. As noted above, NBO 44 handles the interface between a data sink 30 and RBNB module 24. In this regard, NBO 44 provides two important functions: it retrieves data from multiple sources and it merges the data into a single output stream. Thus, NBOs 44 provide data sink 30 with a single interface to all of the data made available by RBNB module 24.

Figure 6:
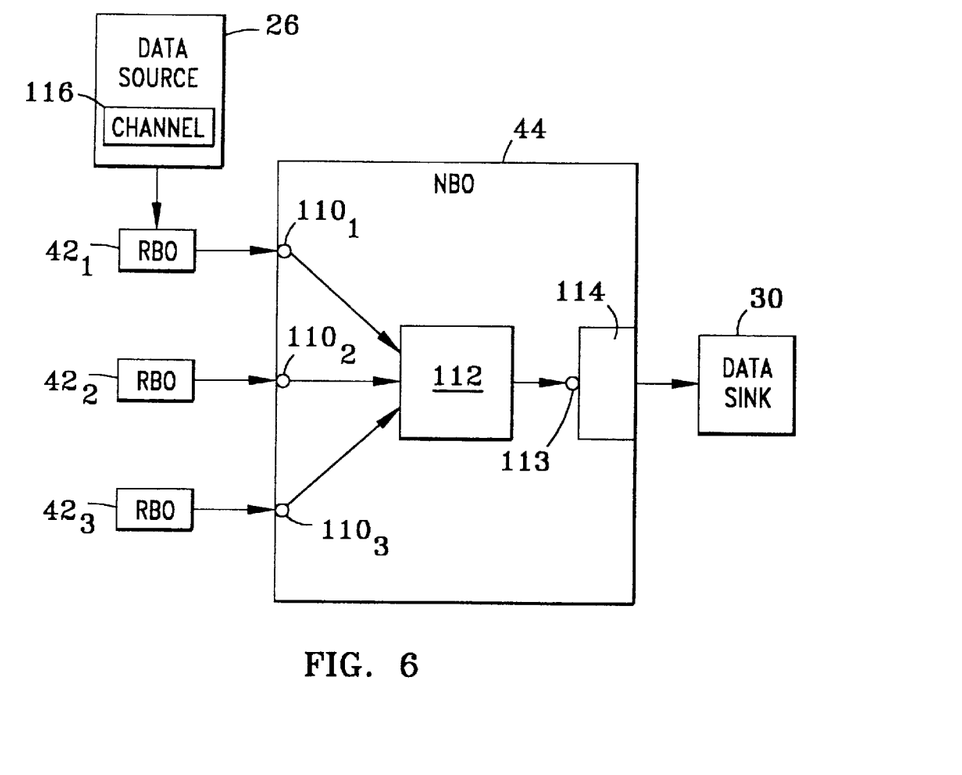
FIG. 6 is a block diagram of the NBO.

The many-input, single-output function of NBO 44 is illustrated in FIG. 6. RBO 42₁, RBO 42₂ and RBO 42₃ provide data via direct memory access, by NBO 44. These data are then delivered to merge data object 112 where the data are merged into a single data stream which is then provided to output 113 connected to output port 114. From there the data stream is delivered to data sink 30.

An NBO 44 is automatically started by RBNB module 24 (via its associated RCO 40) when a connection with a data sink 30 is established. NBO 44 takes requests from data sink 30, determines which RBOs 42 contain the data requested using routing map 48 (FIG. 2), passes the request on to the proper RBOs, merges the data provided by the RBOs into a single data stream with data merge object 112, and passes that on to the data sink.

Data requests to NBO 44 are made by explicit reference to a channel 116 (FIG. 6), plus a time-stamp 250 described in more detail below. A channel 116 is any group of data in a data source 26 which the data source identifies. A channel 116 is identified by the following multi-part descriptor:

RBNB_ID/RBO_ID/Channel_ID

RBNB_ID is of the form Host:Port, indicating the server 12 upon which RBNB module 24 is executing, and the number of a server port 62 of the RBNB. RBO_ID is a unique identification string which identifies the RBO 42 which handles the data from data source 26. RBO_ID is either a simple integer number automatically supplied by RBNB module 24 or is an identification label supplied by the source application of data source 26. Channel_ID is an identification string that identifies the channel 116 for the data. Channel_ID is supplied by the data source application when it registers the subject data source 26.

NBO 44 directly accesses RBO 42 for the information and data required for it to perform its duties. Unlike RBO 42, NBO 44 is always controlled by a client 60.

Figure 7A:
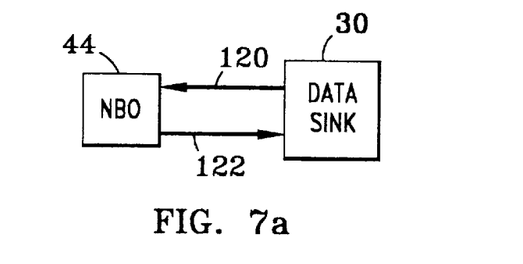
FIGS. 7a and 7b are block diagrams illustrating the two operational modes of the NBO.
Figure 7B:
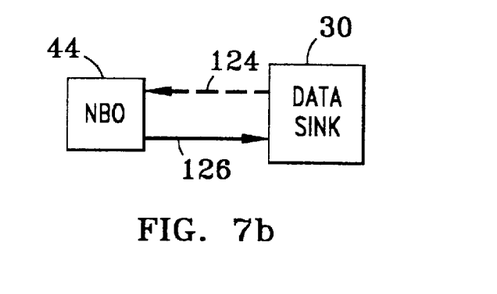

Referring to FIGS. 7a and 7b, NBO 44 runs in two modes: client-controlled request/response mode and client-controlled streaming mode. Client-controlled request/response mode is the basic mode of operation. As illustrated in FIG. 7a, in this mode, a data sink 30 sends a request for data on line 120 to NBO 44, and the NBO sends back one or more data frames in response on line 122 following retrieval of the data from an RBO 42 (not shown in FIG. 7a).

Client-controlled steaming mode provides faster retrieval of data at a cost in flexibility. In this mode, illustrated in FIG. 7b, a data sink 30 sends a one-time data request on line 124 to NBO 44 that can be repeatedly matched with varying data. Examples are requests asking for a continuous stream of the newest data during real-time operation or one that asked for back-to-back data from a starting time stamp 250 to an ending time stamp by a fixed increment. NBO 44 then collects data that matches the request and "streams" it to data sink 30 via line 126.

To achieve this functionality, NBO 44 has various data structures that, among other things, identifies the RCO 40 controlling the NBO, identifies the host machine of the client 60, identifies the port 114 used to communicate with the data sink 30, identifies whether the client or the NBO controls the operation, identifies whether the NBO operates in a request/response or streaming mode, and identifies whether a current request is being satisfied.

Data Frames

Figure 8:
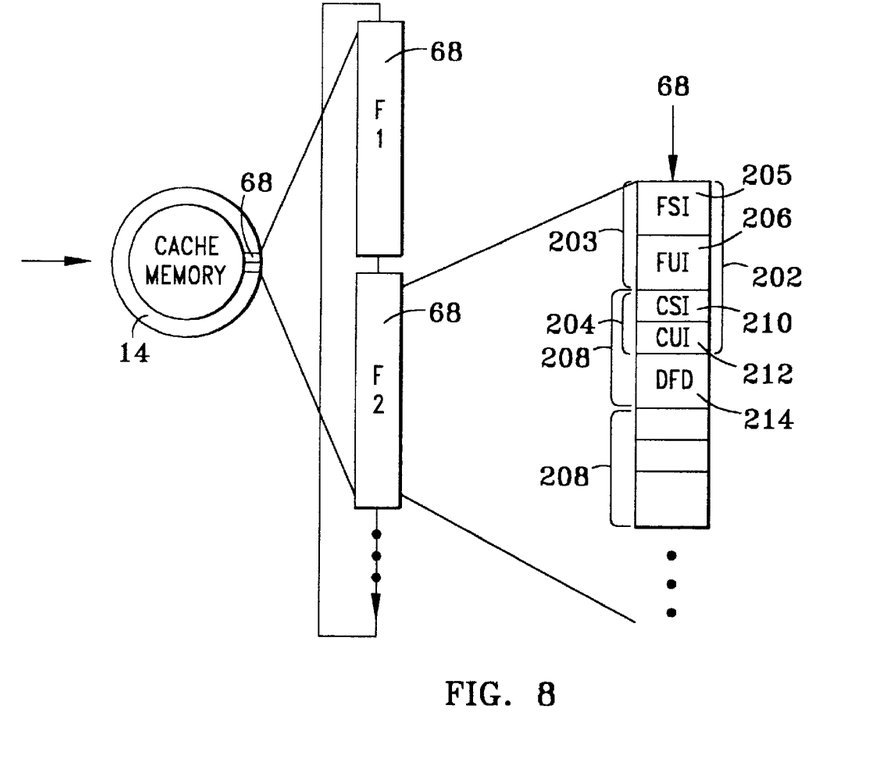
FIG. 8 is a schematic illustration of the data frames of the ring buffers.

Referring to FIG. 8, data frames 68, discussed briefly above, are an important aspect of the operation of RBNB module 24. Indeed, storing data frames 68 comprising the channel 116 data via RBO 42 and distributing the data frames via NBO 44 are the key functions of RBNB module 24.

Each data frame 68 includes several categories of information necessary to efficiently manage the raw data stream. These categories, discussed below, distinguish between "standard" information and "user" information. As described in more detail below, standard information relates to sorting and distributing the data, and user information relates to interpreting the raw data, e.g., for display or analysis. Briefly introducing the categories of information, each data frame 68 includes a frame header 202 that includes a common-frame header 203 and a channel header 204. Common-frame header 203 includes FSI 205, which is frame standard information, and FUI 206, which is frame user-defined information. Channel header 204 is part of channel-related structure CH 208. Channel header 204 includes channel standard information CSI 210, and channel user-defined information CUI 212. CH 208 includes, in addition to channel header 204, data frame data DFD 214. A given data frame 68 typically includes multiple channel-related structures 208, with two such structures being illustrated in FIG. 8. Although not specifically illustrated, a frame header 202 includes FSI 205 and FUI 206 for the data frame 68 and all channel headers 204 for the data frame.

The standard header information contained in FSI 205 and CSI 210 is deliberately kept to the minimum set of data required to efficiently and simply store and distribute data in DFD 214. FSI 205 contains information common to all channels. For example, if all channels share a common time stamp 250, it is stored in FSI 205. CSI 210 contains information unique to each channel, for example if each channel has a unique time stamp 250, it is stored in CSI 210 for each channel. To maximize the flexibility and utility of RBNB module 24, no intrinsic knowledge of the nature or structure of the data itself is presumed by the RBNB module beyond the channel 116 and the time stamp 250 identifying the data. Thus, to RBNB module 24, data from DFD 214 are simply blocks of bytes.

Headers FSI 205 include information specifying the frame size, byte order, common time stamps 250 and frame index. Headers CSI 210 include information specifying channel identification, point size, number of points, offset and stride of channel data DFD 214, and channel time stamps 250.

RBNB module 24 is built upon the paradigm that data is available on a per-channel 116 and time stamp 250 basis. For many applications, such as data streaming time-series data from sensors, this terminology has direct and obvious meaning. For other types of data, the terms "channel" and "time stamp" may have more abstract meaning. For example, a channel 116 can identify a related series of similar analysis results, or the time stamp 250 can be simply an index that is incremented for each block of data.

Describing the user information in data frame 68 in more detail, FUI 206 and CUI 212 are provided to allow user-provided descriptive information to be sent in a manner that does not require specific formats, organization and the like. Thus, information in FUI 206 and CUI 212 is defined entirely by data sources 26 and is "decoded" entirely by data sinks 30. As those skilled in the art will appreciate, the use of appropriate application program interfaces, which do not form part of the present invention, facilitates this communication between data sinks 30 and data sources 26.

The content of data frame 68 allows for the creation of sequential related data frames from data frames that may not otherwise be sequential in response to requests from data sinks 30 for specific channels 116. Such a request results in NBO 44 building a collection of data frames 68 such that all requested channels 116 are provided. When not all channels 116 from a given data source 26 are required, new sub-frames are constructed, leaving out the channel information, i.e., CSI 210, CUI 212 and DFD 214 for channels 116 that were not requested. Such sequential related data frames 68 in essence comprise a single "super frame."

Figure 9:
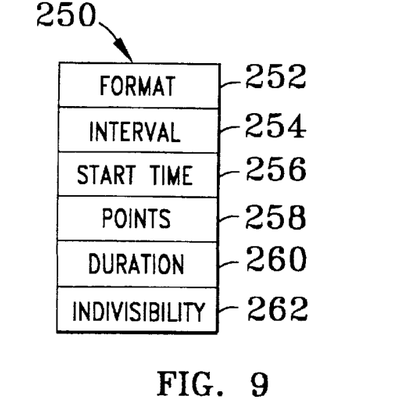
FIG. 9 is a schematic illustration of the contents of a time stamp.

Referring to FIGS. 6 and 9 as mentioned above, data is referenced by both channel 116 (FIG. 6) and time stamp 250 (FIG. 9). Within a given channel, time stamp 250 provides times that can uniquely identify each data word. Here, a data word means anything from a single byte up to a data block consisting of a large number of bytes. Time stamps 250 permit data sources 26 and data sinks 30 to synchronize with each other and align data from different channels 116 which use a common time stamp reference.

The data structure of time stamp 250 comprises several fields including a format 252 which describes the format of the time values. Format 252 is used by data sinks 30 to interpret the times for data words in the associated time stamp 250. Format 252 may be standard or user-defined. Three suitable standard formats are a simple decimal number of unspecified format, an absolute time format to be interpreted as seconds since 1970, and a relative time format to be interpreted as seconds since an arbitrary or user-defined start time.

Time stamp 250 also includes one or more intervals 254 and a start time 256 for each interval. An interval 254 represents one or more data words specified by points 258, that are spread linearly across a range of times, i.e., duration 260.

Time stamp 250 further includes indivisibility 262. If indivisibility 262 indicates an interval 254 is indivisible, then RBNB module 24 returns all of the data words in the interval if the client 60 asks for any part of the time range represented by the interval.

For a given channel 116, a data source 26 and data sink 30 must agree upon the format of time stamp 250. Any format will work so long as it is consistently used between collaborating data sources and data sinks. For example, analysis blocks can be simply sequentially numbered. One important restriction does exist, however. Time stamps 250 must monotonically increase in value to facilitate efficient searches for specified time stamped data frames 68.

In request/response mode operation, whether client-controlled or RBO-controlled, data source 26 is responsible for adding a time stamp 250 to the data. For users who wish to precisely synchronize data collected at geographically dispersed locations, universal time sources such as global positioning satellite time clocks may be satisfactorily used at the option of data sources 26 and data sinks 30.

In streaming mode operation, client 60 provides a time stamp 250 as part of the initial frame header 202, and RBNB module 24 generates a time stamp for each subsequent data frame 68 automatically. RBNB module 24 uses three schemes for producing such time stamps. In all three schemes, RBNB module 24 maintains the relationship between the times of intervals 254.

In the first scheme, RBNB module 24 sets the time of the first interval 254 in time stamp 250 to the time when each data frame 68 arrives. With this scheme, the format of time stamps 250 is absolute seconds since 1970. In the second scheme, RBNB module 24 uses the time stamp 250 for the first data frame 68 as provided. For subsequent frames, the time of the first interval 254 is set to the time plus duration of the last interval 254 from the previous data frame. For the third scheme, RBNB module 24 uses the arrival time for the first data frame 68 as the time for the first interval 254. For subsequent data frames 68, the time of the first interval 254 is set to the time plus duration of the last time interval 254 of the previous data frame 68.

For the sake of efficiency, sequential data frames 68 with unchanging frame headers 202 can be sent with short headers containing only the fields that have changed. To support this, RBNB module 24 maintains a copy of the most recent complete frame headers 202 for all data frames 68 so that these repeated short-header data frames can reference the applicable information in the copy of the complete frame header.

Additional Ring Buffer Structures

As described above, RBNB module 24 manages data frames 68 in cache memory 14 and in archive memory 18 by maintaining the data frames in a ring buffers 64 and 66, respectively. Following the preceding detailed description of data frames 68, a more detailed description of ring buffers 64 and 66 is now possible.

To enhance the functionality of RBNB module 24, the latter accommodates various types of ring buffers 64 and 66. The standard ring buffers 64 and 66 make no assumptions about the format of the data. Client 60 can change the format from data frame 68 to data frame so long as time monotonically increases. Other ring buffers 64 and 66 could be optimized to handle specific cases, such as where all of the data frames 68 have an identical structure and differ only by time stamp 250.

Figure 10:
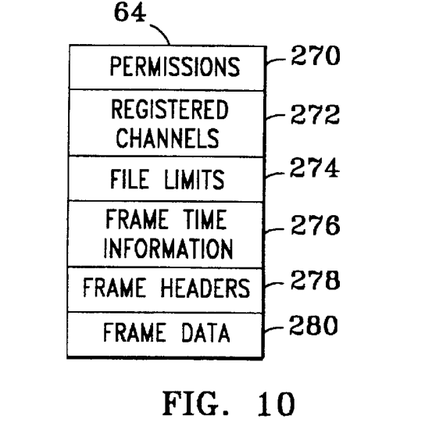
FIG. 10 is a schematic illustration of the sections of the ring buffers.

The standard ring buffers 64 and 66 are implemented in six separately managed sections, which are illustrated in FIG. 10. Permissions section 270 stores access authorization information for the RCO 40 associated with the RBO 42 controlling ring buffer 66. Permissions section 270 is used to determine who can open ring buffer 66 and what they can do with it. Registered channels section 272 stores channels 116 registered with an RBO 42.

File limits section 274 stores the location of three pieces of information for the oldest and newest data frames 68 in ring buffers 64 and 66. This information for data frame 68 is time stamp 250, the frame header 202 and frame data DFD 214.

Frame time information section 276 stores six pieces of information for each data frame 68. This information consists of the frame index of the data frame 68, which is an automatically incremented internal frame counter used to help search and manage frames. This information also includes start and end times for the data frame 68 and a frames-follow flag which indicates that multiple frames together comprise a "super frame," as previously discussed. Also included is information regarding the number of previous data frames 68 with which the time for the present data frame overlaps. Information regarding the location and size of the frame header 202 for the data frame 68 and the location and size of the frame data DFD 214 is also included.

Frame headers section 278 includes frame header 202 for each data frame 68. Frame data section 280 includes frame data DFD 214 for each data frame 68.

Figure 11:
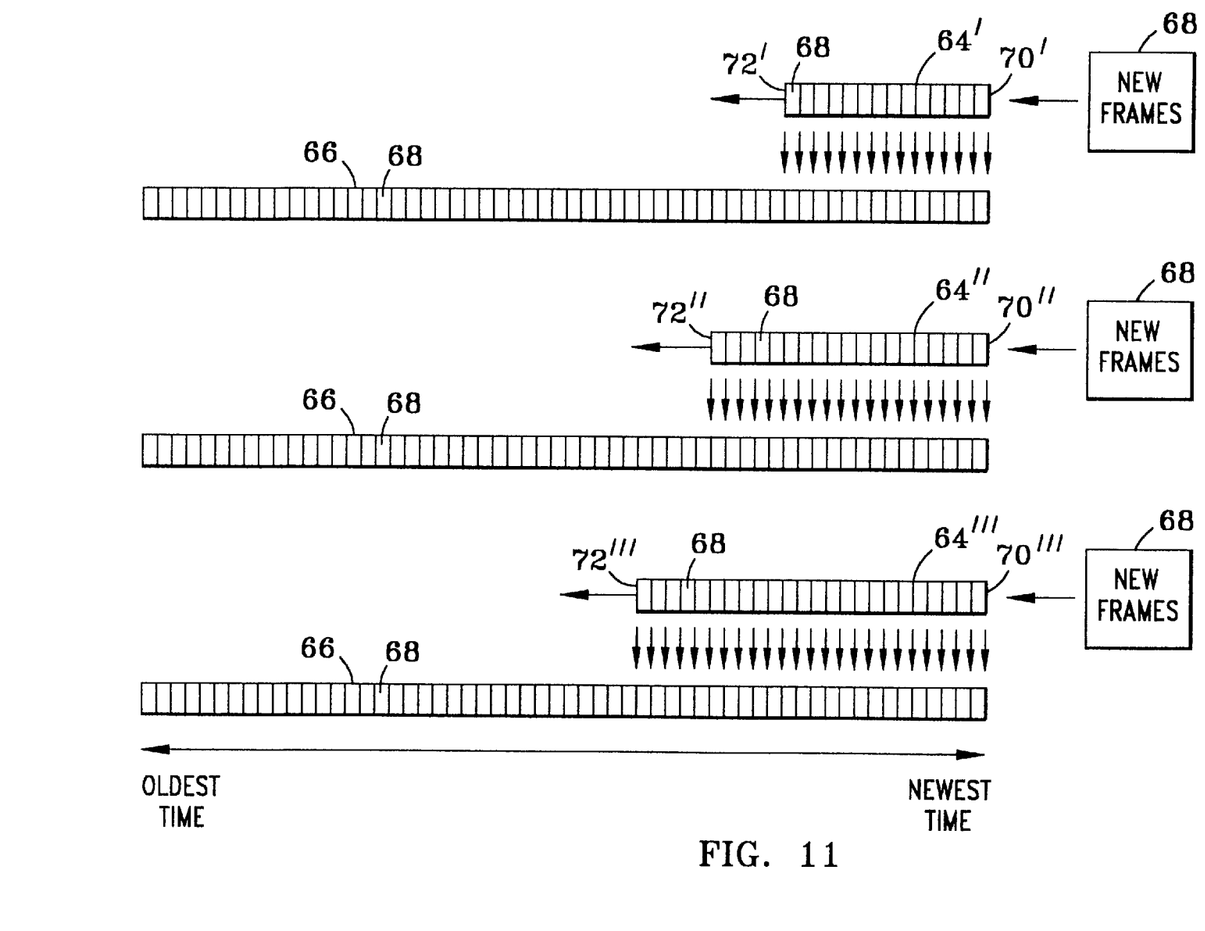
FIG. 11 is a schematic representation of three components of the ring buffer associated with cache memory.

Referring now to FIGS. 4 and 11, ring buffer 64 is used when data is being written by a data source 26 to RBNB module 24. Ring buffer 64 provides several functions. First, ring buffer 64 provides the only source of data storage when ring buffer 66 is inactive. Second, ring buffer 64 provides temporary storage when bursts of data are sent to RBNB module 24 faster than can be written to ring buffer 66. Third, ring buffer 64 provides data sinks 30 with quick access to the most recent data.

This functionality is achieved by providing the overall ring buffer 64 with three components, each of which can be independently configured. These components are data cache 64', header cache 64" and time cache 64'". While these components are indicated in FIG. 11 as linear structures to facilitate illustration, it is to be appreciated they actually have the ring buffer data structure described above with respect to ring buffer 64. Similarly, while ring buffers 66 are illustrated in linear format adjacent each of data cache 64', header cache 64" and time cache 64'", it is to be appreciated they have the ring buffer data structure described above. Data cache 64' (FIG. 11) implements the three functions described above and contains complete data frames 68 for the most recent data. Header cache 64" contains frame headers 202 for the recent data. Time cache 64'" contains time stamps 250 for the most recent data.

As data frames 68 arrive, the full frames (including frame data DFD 214, frame header 202, and time stamps 250) are stored in data cache 64'. Partial frames, including only frame headers 202 and time stamps 250 are stored in cache 64". Time stamps 250 alone are stored in cache 64'". When the number of data frames 68 in data cache 64' exceed its capacity, the oldest data frames are discarded from ring buffer 64' at old data end 72'. The oldest frame data may still exist in the larger ring buffer 66. When the number of data frames 68 with only a frame header 202 exceeds the capacity of cache 64", the oldest headers 202 are discarded from cache 64". Finally, when the number of frame headers 202 with only time stamps 250 exceeds the capacity of cache 64'", the time stamps are discarded and no part of data frames 68 remain in ring buffer 64, although this information may continue to reside in the ring buffer 66.

Data cache 64' provides high-speed access to a limited number of the newest data frames 68. When ring buffer 66 is being actively written, header cache 64" and time cache 64'" can be used to smooth the performance transition when the search for data frames 68 moves out of ring buffer 64 into ring buffer 66. Header cache 64" and time cache 64'" are preferably sized so as to store enough information, along with pointers into ring buffer 66, to keep all or most of the search for requested data frames 68 from having to access the relatively slow ring buffer 66 for this information.

Selecting the proper sizes for the three components of ring buffer 64 is driven by the intended application. Data cache 64' should be sized to store enough data to satisfy quick-access demands. Time cache 64'" should be sized to match the entire length of ring buffer 66. Header cache 64" should be set at an intermediate value between these two.

Ring buffer 66 can be configured to hold a certain number of complete data frames 68 and can be set up to archive data in one of three modes: synchronously, a synchronously and as time allows. When archiving is synchronous, data frames 68 are added to ring buffer 64 and are immediately written to ring buffer 66. This provides the most secure archiving of data at the expense of some responsiveness.

When archiving is asynchronous, RBO 42 writes information to ring buffer 66 as it is discarded from ring buffer 64. Also, when RBNB module 24 determines there are no new data frames 68 waiting to be added to ring buffer 64, it will archive information still in ring buffer 64 to ring buffer 66.

When archiving as time allows, RBO 42 will only write data frames 68 to ring buffer archive 66 when there are no new data frames 68 waiting to be added to ring buffer 64. If there is a new data frame 68 waiting to be added to ring buffer 64 when ring buffer 64 is full, data frames that have not already been written to ring buffer 66 will be lost. This mode provides maximum responsiveness at the risk of not archiving some data under maximum load conditions.

A client 60 can request that data frames 68 previously saved in ring buffer 66 be reloaded in ring buffer 64. If storing of the data frames 68 was terminated abnormally, as in a system crash, RBO 42 attempts to reconstruct the data frames based on the information it finds in the various sections of ring buffer 66.

RBNB-To-RBNB Connections

Referring to FIGS. 1–4 and 6, RBNB modules 24 connect to each other to share data provided by data sources 26 across network 28 (FIG. 1). These connections can be either plain status and control connections used to exchange routing information or they can have an associated data connection to move or mirror data from one RBNB module 24 to another.

RBNB modules 24 on a network 28 must exchange routing information to be able to share data. An authorized client 60 can command an RBNB module 24 to establish a routing connection to another RBNB module. A local RBNB module 24 creates an RCO 40 that connects as a client 60 to a remote RBNB module 24. RCOs 40 in the local and remote RBNB modules 24 then use the connection to automatically exchange routing information. The NBOs 44 in the RBNB modules 24 use the routing information to locate channels 116 (FIG. 6).

As mentioned above, routing information is maintained in routing maps 48 (FIG. 2). Each RBNB module 24 keeps a routing map for itself and one for each RBNB module with which it is exchanging routing information. Routing maps 48 include an identification of the server 12 (FIG. 1) and server port 62 (FIG. 3), and a list of available channels 116, including complete names and authorization requirements. The list of channels 116 in routing map 48 for the RBNB module 24 itself is updated whenever a client 60 registers or unregisters a channel. These channels 116 provide a pointer to the RBO 42 that maintains the data for the channel.

A list of channels 116 in routing map 48 that have been routed is updated via the routing connection. RBNB modules 24 take turns sending two lists each of channels 116. One list contains all of the new channels 116 added to any of the routing maps 48, except the routing map for the receiving RBNB module, since the last time the lists were sent. The other list contains all of the channels 116 that are no longer in any of the routing maps 48 for the RBNB module 24. Channels 116 are appropriately added or deleted in the corresponding routing maps 48.

When a client 60 requests data for a channel 116, the local NBO 44 searches for a match in the channel list of routing map 48, starting with that of the local RBNB module 24. If the local NBO 44 finds the channel 116 in the local routing map 48, then it gets the data from the local RBO 42.

If the local NBO 44 finds the channel 116 in the routing map 48 of a remote RBNB module 24, it gets the data from a local RBO 42 connected to a remote NBO 44 in the remote RBNB module.

The first time the local NBO 44 is asked to retrieve data for a remote channel 116, it automatically creates a local RCO 40 and local RBO 42 connected to a remote RCO 40 and remote NBO 44, respectively, in the remote RBNB module 24.

Each NBO 44 creates its own private connection to the remote RBNB modules 24 from which it needs data. Routed connections are not shared between multiple NBOs 44 to ensure that any access authorization requirements of the connected clients 60 can be handled separately. In this regard, it is often desirable to permit an RBNB module 24 to access a routed channel 116 only if a properly specified user name and password is provided. User name and password tables are maintained in access authorization requirements 46 (FIG. 2) to support this functionality.

Figure 12:
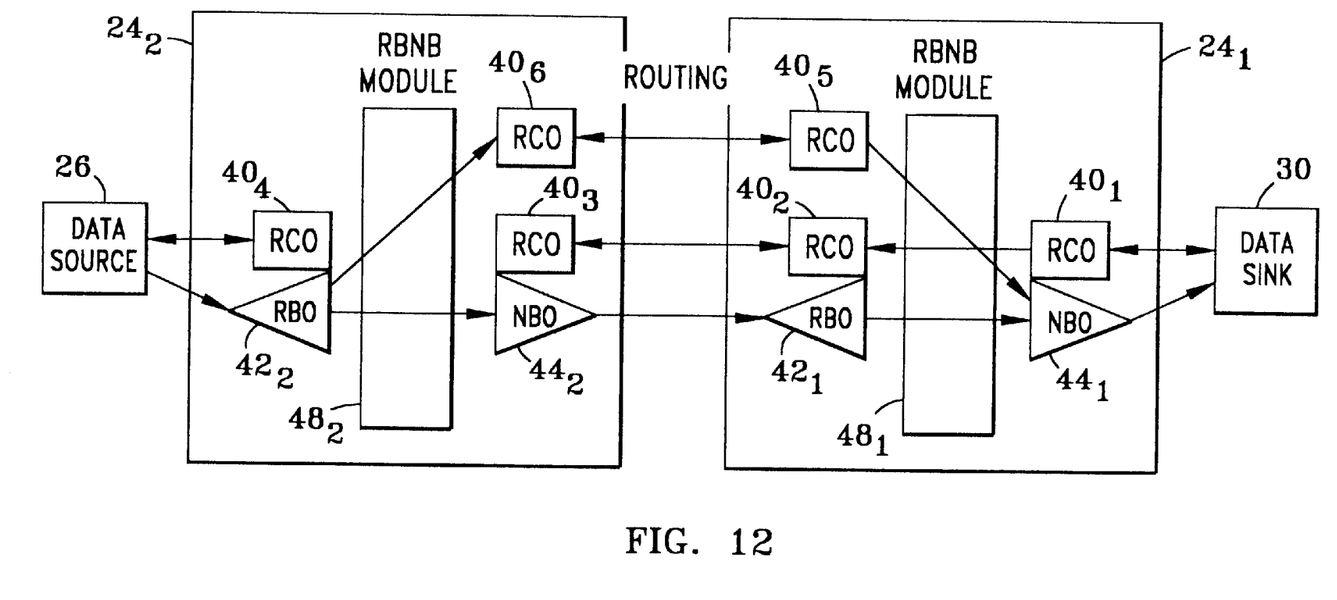
FIG. 12 is a block diagram illustrating channel routing from data source to data sink via two RBNB modules.

An example of a routing of data from a data source 26 to a data sink 30 via an RBNB module 24 to RBNB module routing is illustrated in FIG. 12. In this example, data sink 30 requests data for a channel 116 from RBNB module $24_1$, which is handled by RCO $40_1$. Associated NBO $44_1$ searches the list of channels 116 in routing map $48_1$ in RBNB module $24_1$ first to determine if the requested channel exists in the routing map. If so, then NBO $44_1$ gets the data from the appropriate RBO 42 in RBNB module $24_1$. Assuming, however, NBO $44_1$ is unable to find the requested channel 116 in routing map $48_1$, it then searches routing map $48_2$ supplied by remote RBNB module $24_2$. If it finds the requested channel 116, NBO $44_1$ gets the data via RBO $42_1$ which obtains the data from NBO $44_2$ in remote RBNB module $24_2$, with control information being exchanged between RCO $40_2$ (associated with RBO $42_1$) and RCO $40_3$ (associated with NBO $44_2$). The remote NBO $44_2$ obtains the data via remote RBO $42_2$, which in turns obtains the data from data source 26, in concert with its associated RCO $40_4$. The routing connection between RCO $40_5$ and RCO $40_6$ in FIG. 12 is used to exchange lists of channels 116 between RBNB module $24_1$ and RBNB module $24_2$.

The preceding discussion ignored the possibility of having the same channel 116 in two or more simultaneously accessible routing maps 48. In addition, the possibility of infinite recursion exists when three or more RBNB modules 24 are connected by routing. These problems are addressed by the RBNB modules 24 based on the following information in routing map 48: the priority of the routing map, the primary list of channels 116 and a standby list of channels.

The priority of a routing map 48 determines the order in which an NBO 44 searches the routing maps for channels 116. The routing map 48 for the RBNB module 24 itself is always searched first, with the remaining maps being searched in priority order, from highest to lowest. Routing maps 48 at the same priority are searched in the order established. Although the search order priority of the routing map 48 for the RBNB module 24 itself always remains first, it may be advantageous to change priority of other routing maps to optimize performance for all users or to give priority to certain users.

The standby list of channels 116 ensures that channels are not infinitely routed. When the same channel 116 appears in more than one routing map 48 in a given RBNB module 24, it will appear in the primary list of channels of only the highest priority routing map, and will appear in the standby list of channels of all lower priority routing maps. Only channels 116 in the primary list of channels, at any given time, are used for routing. Should a channel 116 in a primary list of channels be deleted, the standby list of channels are searched and the next highest priority routing map promotes this channel to its primary list.

The preceding description sets forth how routing connections can be used by one RBNB module 24 to retrieve data from other RBNB modules. If several clients 60 of a local RBNB module 24 independently request data from a remote RBNB module 24, each one has its own RCO 40/RBO 42 connection to the remote RBNB module. If the clients 60 request the same data, it is transferred multiple times via multiple connections.

The architecture of RBNB modules 24 provide an alternate way to move data in this situation, known as "mirroring." A client 60 can ask an RBNB module 24 to mirror selected channels 116 of data to or from a remote RBNB module. Any data that the client 60 is authorized to access can be mirrored. The mirror can operate in either request/response or streaming mode. In request/response mode, all clients 60 share the same transfer path, but data can be transferred multiple times (similar to routing). In streaming mode, data becomes available on the receiving end as if it were being continuously delivered by a third-party data source 26.

A client 60 establishes a mirror by issuing a special command to create one. The command determines the direction of the mirror and the operation mode. In streaming mode, the command also provides a request for data. The mirror streams data continuously by repeatedly satisfying the request. Commands are also provided to allow clients 60 to later change the request if different data are desired.

When an RBNB module 24 receives a command to establish a mirror, it creates a new RCO 40. That RCO 40 initiates a connection to a remote RBNB module 24, asks the RCO in the remote RBNB module to start either an NBO 44 or RBO 42, as appropriate, and creates a local RBO or NBO to talk with the remote NBO or RBO.

A streaming mirror is controlled by the NBO 44 side. Either at creation time or through subsequent commands, a request is provided to the NBO 44. It repeatedly satisfies that request and sends the data to the RBO 42. NBOs 44 in the RBNB module 24 containing such RBO 42 see the RBO as just another data source 26.

A request/response mirror is controlled by the RBO 42 side. When an NBO 44 in a first RBNB module 24 makes a request for a mirror channel, the request is sent by the RBO 42 in the first RBNB module to the NBO in a second RBNB module and the response is sent back to the NBO in the first RBNB module. A request/response mirror is similar to routing of channel 116, in that data is retrieved only on demand. It differs in that mirrored channels 116 provide an opportunity to establish up-front authorization, if desired.

Figure 13:
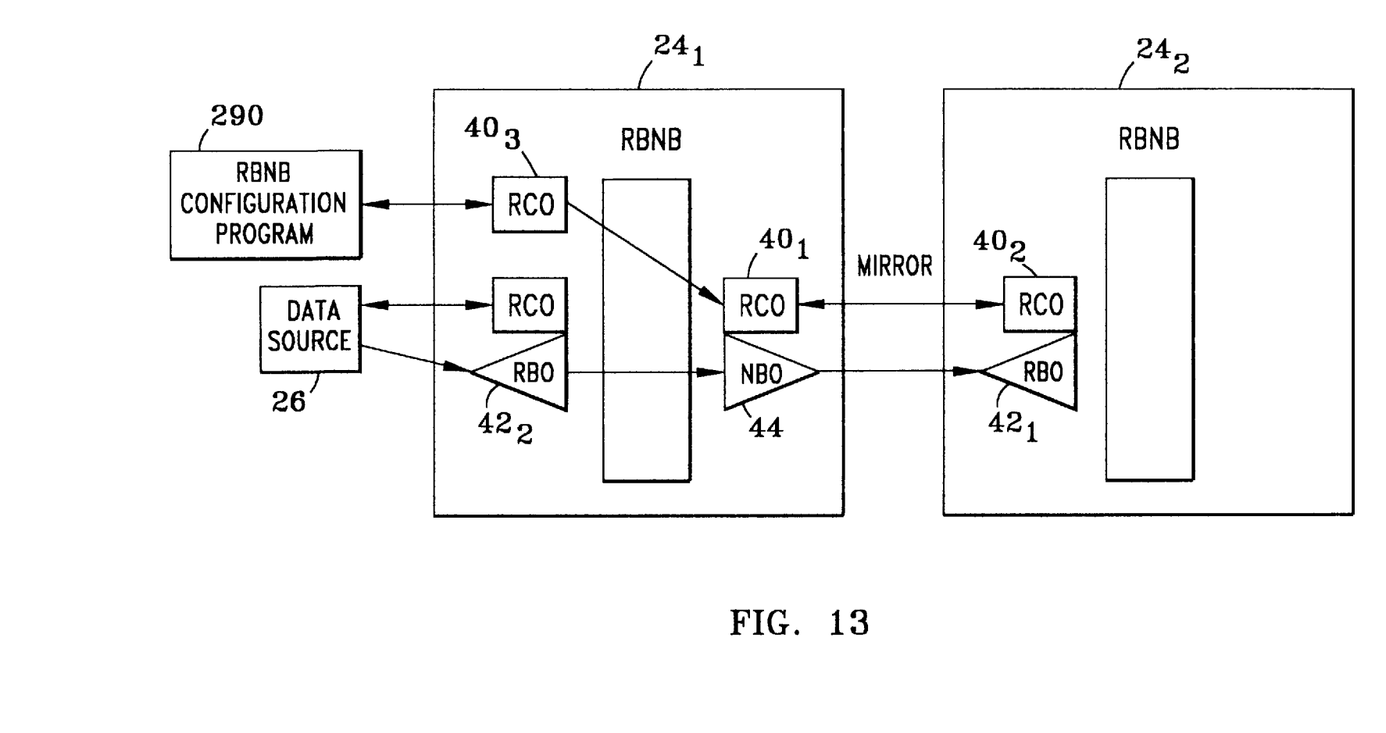
FIG. 13 is a block diagram illustrating data mirroring between two RBNB modules.

An example of a client 60 establishing a mirror from local RBNB module $24_1$ to remote RBNB module $24_2$ is provided in FIG. 13. The mirror is established by the configuration program 290 connected to the RCO $40_3$. When local RBNB module $24_1$ receives a request to establish a mirror, RCO $40_1$ in local RBNB module $24_1$ initiates the connection by asking RCO $40_2$ to create RBO $42_1$. Local RBNB module $24_1$ creates NBO 44 to communicate with RBO $42_1$. NBO 44 then obtains the requested data from RBO $42_2$, which in turn obtains the data from data source 26, and provides the data to RBO $42_1$.

The present RBNB data management system 10 has many advantages. It provides a modular, flexible, robust environment for meeting the needs of distributed data management applications. It enables widely dispersed users to collaboratively contribute, monitor, analyze, and otherwise share real-time and archived information. It achieves this through its uniquely efficient capability to provide continuous data access to many data sinks 30 from many data sources 26 via time stamp 250 and reference to channel 116, and through the use of an intermediate data ring buffers 64 and 66. It is a very scaleable tool, allowing interconnection between multiple RBNB modules 24 which provides open-ended expandability in terms of access to computing resources and number of simultaneous connections.

Since certain changes may be made in the above method and system without departing from the scope of the present invention, it is intended that all matter contained in the above description or shown in the accompanying drawings shall be interpreted in an illustrative and not in a limiting sense.

What is claimed is:

1. A data management system comprising:
   a. at least one server having cache memory and archive memory;
   b. at least one RBNB module operatively associated with said at least one server, each including:
      i. a plurality of ring buffer objects, each having:
         (1) a ring buffer data structure for storing data;
         (2) a single data input connectable to a data source and connected to said ring buffer data structure so that data provided by the data source may be stored in said ring buffer data structure;
         (3) one or more RBO data outputs connected to said ring buffer data structure for providing data stored in said ring buffer data structure; and
      ii. a plurality of network bus objects, each having:
         (1) one or more inputs, each connected with at least one of said one or more RBO data outputs so as to receive data stored in said ring buffer data structure;
         (2) a single NBO data output, connectable to a data sink, for providing to the data sink said data received from said at least one of said one or more RBO data outputs.

2. A data management system according to claim 1, further comprising a plurality of ring control objects, each for handling connections with (a) a corresponding respective one of said plurality of ring buffer objects or (b) a corresponding respective one of said plurality of network bus objects.

3. A data management system according to claim 1, further wherein said ring buffer data structure includes a cache ring buffer data structure for short-term storage of data and an archive ring buffer data structure for long-term storage of data.

4. A data management system according to claim 1, wherein each data source has at least one channel with associated data, the system further comprising:
   a. means for creating a plurality of data frames, each having:
      i. data associated with one or more channels of the data source; and
      ii. an identification for each of said one or more channels;
   b. means for adding a time stamp to each of said plurality of data frames; and
   c. wherein said ring buffer data structure stores said data as said plurality of data frames.

5. A data management system according to claim 4, wherein said means for creating creates a frame header in each of said plurality of data frames which includes said identification and said time stamp, further wherein said ring buffer data structure includes a data cache for storing entire ones of said plurality of data frames, a header cache for storing only said frame headers and a time cache for storing only said time stamps.

6. A data management system according to claim 1, wherein each data source has at least one channel with associated data, further wherein said at least one RBNB module includes at least one routing map associated with said plurality of network bus objects that includes a list of channels in the data sources.

7. A data management system according to claim 5, wherein each of said plurality of ring buffer objects is capable of obtaining a plurality of data frames from a data source, following receipt of a request from the data source, by reading said frame header and associated data for each data frame.

8. A data management system according to claim 5, wherein each of said plurality of ring buffer objects is capable of obtaining a plurality of data frames from a data source, following receipt of a request from the data source, by reading said frame header and associated data for a first one of said plurality of data frames and then reading associated data for remaining ones of said plurality of data frames without associated frame headers.

9. A data management system according to claim 1, wherein said plurality of ring buffer objects are capable of requesting data from a data source.

10. A data management system according to claim 1, wherein said plurality of network bus objects are capable of providing said data frames, following receipt of a request from a data sink.

11. A data management system according to claim 1, wherein each of said plurality of network bus objects is capable of providing a plurality of data frames to a data sink, following receipt of a request from the data sink, by providing said frame header and associated data for a first one of said plurality of data frames and then providing associated data for remaining ones of said plurality of data frames without associated frame headers.

12. A data management system according to claim 1, further including a network attached to said at least one server, a data sink attached to said network and a data source attached to said network.

13. A data management system according to claim 1, further wherein:
   a. each of said plurality of ring buffer objects includes an input port connected to said single data input and connectable to a data source so that data provided by the data source enters said single data input via said input port; and
   b. each of said plurality of network bus objects includes an output port connected to said single NBO data output and connectable to a data sink so that data provided to the data sink exits said output port via said single NBO data output.

14. A data management system according to claim 1, wherein said at least one RBNB module includes a first RBNB module and a second RBNB module, wherein at least one of said plurality of ring buffer objects from said first RBNB module is connectable with at least one of said plurality of network bus objects from said second RBNB module so that data from said first RBNB module may be mirrored on said second RBNB module.

15. A data management system according to claim 1, wherein said at least one RBNB module includes a first RBNB module and a second RBNB module, wherein said first RBNB module is connectable with said second RBNB module so that data requested by a data sink connected with said first RBNB module, which is present at a data source, may be routed to said data sink via said second RBNB module.

16. A server network for use in communicating data from at least one data source to at least one data sink, each data source having at least one channel with associated data, the network comprising:
    a. a plurality of ring buffer objects, each including:
        i. means for creating a plurality of data frames, each having data that is identified with one or more channels of the data source;
        ii. means for adding a time stamp to each of said plurality of data frames; and
        iii. a ring buffer data structure for storing said plurality of data frames.

17. A server network according to claim 16, wherein each of said plurality of ring buffer objects includes:
    a. a single data input connectable to a data source and connected to said ring buffer data structure so that data provided by the data source may be stored in said ring buffer data structure; and
    b. one or more RBO data outputs connected to said ring buffer data structure for providing data stored in said ring buffer data structure.

18. A server network according to claim 16, further wherein said ring buffer data structure includes a cache ring buffer data structure for short-term storage of data and an archive ring buffer data structure for long-term storage of data.

19. A server network according to claim 16, wherein each data source has at least one channel with associated data, the network further comprising:
    a. means for creating a plurality of data frames, each having:
        i. data associated with one or more channels of the data source; and
        ii. an identification of each of said one or more channels;
    b. means for adding a time stamp to each of said plurality of data frames; and
    c. wherein said ring buffer data structure stores said data as said plurality of data frames.

20. A server network according to claim 19, wherein said means for creating creates a frame header in each of said plurality of data frames which includes said identification and said time stamp, further wherein said ring buffer data structure includes a data cache for storing entire ones of said plurality of data frames, a header cache for storing only said frame headers and a time cache for storing only said time stamps.

21. A server network according to claim 16, wherein each data source has at least one channel with associated data, further wherein said at least one RBNB module includes at least one routing map, associated with said plurality of network bus objects, that includes a list of channels in the data sources.

22. A server network according to claim 20, wherein each of said plurality of ring buffer objects is capable of obtaining a plurality of data frames from a data source, following receipt of a request from the data source, by reading said frame header and associated data for each of said plurality of data frames.

23. A server network according to claim 20, wherein each of said plurality of ring buffer objects is capable of obtaining a plurality of data frames from a data source, following receipt of a request from the data source, by reading said frame header and associated data for a first one of said plurality of data frames and then reading associated data for remaining ones of said plurality of data frames without associated frame headers.

24. A server network according to claim 16, wherein said plurality of ring buffer objects are capable of requesting data from a data source.

25. A server network according to claim 16, further including:
    a. at least one server including said plurality of ring buffer objects;
    b. a network attached to said at least one server;
    c. a data sink attached to said network; and
    d. a data source attached to said network.

26. A server network according to claim 16, further wherein each of said plurality of ring buffer objects includes an input port connected to said single data input and connectable to a data source so that data provided by the data source enters said single data input via said input port.

27. A method of transferring data from a data source to a data sink, the method comprising the steps:
    a. receiving data from a data source via a single data stream;
    b. storing said data in a ring buffer data structure in which newest data is placed at a new data end of said ring buffer data structure and oldest data is deleted from an old data end of said ring buffer data structure to make room for new data;
    c. providing data from said ring buffer data structure via two or more first data streams;
    d. receiving data from two or more second data streams, only one of which consists of one of said two or more first data streams; and
    e. providing all said data received in said step d via a single data stream.

28. A method according to claim 27, further comprising the step of performing said steps a–e simultaneously with respect to each of a plurality of data sources.

29. A method according to claim 27, wherein said step b involves first storing said data in a cache ring buffer data structure for short-term storage and also storing said data in a archive ring buffer data structure for long-term storage.

30. A method according to claim 29, wherein said data is stored in said archive ring buffer data structure synchironously with storage of said data in said cache ring buffer data structure.

31. A method according to claim 29, wherein said data is stored in said archive ring buffer data structure as oldest data is deleted from said cache ring buffer data structure.

32. A method according to claim 29, wherein said data is stored in said archive ring buffer data structure only when no data is waiting to be stored in said cache ring buffer data structure.

33. A ring buffered network bus system comprising:
    a. first means for receiving data from a data source via a single data stream;
    b. second means for storing said data in a ring buffer data structure in which newest data is placed at a new data end of said ring buffer data structure and oldest data is deleted from an old data end of said ring buffer data structure to make room for new data;

c. third means for providing data from said ring buffer data structure via two or more first data streams;

d. fourth means for receiving data from two or more second data streams, only one of which consists of one of said two or more first data streams; and e. fifth means for providing all said data received in said step d via a single data stream.

34. A system according to claim 33, wherein said first means, said second means and said third means together are included in a ring buffer object.

35. A system according to claim 33, wherein fourth means and said fifth means are included in a network bus object.

36. A computer readable storage media comprising:

a. a plurality of ring buffer objects, each having:
 i. a ring buffer memory for storing data;
 ii. a single data input connectable to a data source and connected to said ring buffer memory so that data provided by the data source may be stored in said ring buffer memory;
 iii. one or more RBO data outputs connected to said ring buffer memory for providing data stored in said ring buffer memory; and b. a plurality of network bus objects, each having:
 i. one or more inputs, each connected with at least one of said one or more RBO data outputs so as to receive data stored in said ring buffer memory;
 ii. a single NBO data output, connectable to a data sink, for providing to the data sink said data received from said at least one of said one or more RBO data outputs.

37. A computer readable storage media according to claim 36, further comprising a plurality of ring control objects, each for handling connections with (a) a corresponding respective one of said plurality of ring buffer objects and (b) a corresponding respective one of said plurality of network bus objects.

* * * * *